US012037110B2

(12) United States Patent
Pfaller et al.

(10) Patent No.: US 12,037,110 B2
(45) Date of Patent: Jul. 16, 2024

(54) ROTARY WING AIRCRAFT WITH A SHROUDED TAIL PROPELLER

(71) Applicant: AIRBUS HELICOPTERS DEUTSCHLAND GMBH, Donauworth (DE)

(72) Inventors: Rupert Pfaller, Riemerling (DE); Tobias Ries, Nordendorf (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 84 days.

(21) Appl. No.: 17/564,297

(22) Filed: Dec. 29, 2021

(65) Prior Publication Data

US 2022/0258858 A1 Aug. 18, 2022

(30) Foreign Application Priority Data

Jan. 27, 2021 (EP) ..................................... 21400002

(51) Int. Cl.
*B64C 27/82* (2006.01)
*B64C 11/00* (2006.01)
(Continued)

(52) U.S. Cl.
CPC ............ *B64C 27/82* (2013.01); *B64C 11/001* (2013.01); *B64C 23/08* (2013.01); *B64C 27/06* (2013.01);
(Continued)

(58) Field of Classification Search
CPC ............ B64C 27/82; B64C 2027/8236; B64C 2027/8254
See application file for complete search history.

(56) References Cited

U.S. PATENT DOCUMENTS 2,452,355 A    10/1948   Nall
3,241,791 A     3/1966   Piasecki
(Continued)

FOREIGN PATENT DOCUMENTS

DE    1456070 A1   3/1969
EP    1395489 A2   3/2004
(Continued)

OTHER PUBLICATIONS

European Search Report for European Application No. EP 21400002. 8, Completed by the European Patent Office, Dated Jun. 18, 2021, 8 pages.

*Primary Examiner* — Nicholas McFall
(74) *Attorney, Agent, or Firm* — Brooks Kushman P.C.

(57) ABSTRACT

The present disclosure relates to a rotary wing aircraft that extends along an associated roll axis between a nose region and an aft region. The rotary wing aircraft comprises a main rotor; a shrouded duct that is arranged in the aft region and that forms an inner air duct, wherein the shrouded duct is formed to generate sideward thrust for main rotor anti-torque in forward flight condition of the rotary wing aircraft; and a propeller that is at least configured to propel the rotary wing aircraft in the forward flight condition; wherein the propeller forms a circular propeller disc in rotation around an associated rotation axis; and wherein the propeller is rotatably mounted to the shrouded duct such that the circular propeller disc is at least essentially arranged inside of the inner air duct.

15 Claims, 9 Drawing Sheets

(51) Int. Cl.
  *B64C 23/08* (2006.01)
  *B64C 27/06* (2006.01)
  *B64C 27/16* (2006.01)

(52) U.S. Cl.
  CPC ...... *B64C 27/16* (2013.01); *B64C 2027/8236* (2013.01); *B64C 2027/8254* (2013.01)

(56) References Cited

U.S. PATENT DOCUMENTS

| | | |
|---|---|---|
| 3,260,482 A | 7/1966 | Oleg |
| 3,432,119 A * | 3/1969 | Miller .................... B64C 27/82 |
| | | 244/6 |
| 4,905,932 A | 3/1990 | Piasecki |
| 4,928,907 A | 5/1990 | Zuck |
| 5,209,430 A | 5/1993 | Wilson et al. |
| 6,755,374 B1 | 6/2004 | Carson |
| 10,641,290 B1 * | 5/2020 | Piasecki .................... B64C 7/02 |
| 2009/0236467 A1 * | 9/2009 | Heminway ............... B64C 7/00 |
| | | 244/17.11 |
| 2013/0087653 A1 * | 4/2013 | Brand .................... B64C 27/82 |
| | | 244/17.19 |
| 2020/0339252 A1 * | 10/2020 | Choi ...................... B64C 27/82 |

FOREIGN PATENT DOCUMENTS

| | | |
|---|---|---|
| EP | 2511177 A1 | 10/2012 |
| EP | 2808253 A1 | 12/2014 |
| EP | 3317180 A2 | 5/2018 |
| FR | 2897040 A1 | 8/2007 |
| RU | 2282565 C2 | 8/2006 |
| RU | 2652863 C1 | 5/2018 |
| WO | 2002087967 A2 | 11/2002 |
| WO | 2014176431 A1 | 10/2014 |
| WO | 2016048785 A1 | 3/2016 |
| WO | 2017027112 A2 | 2/2017 |

* cited by examiner

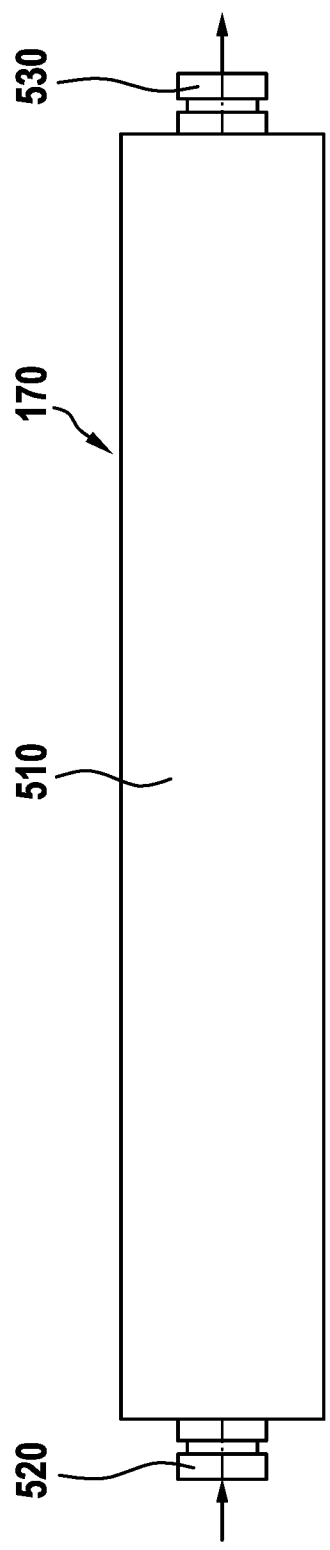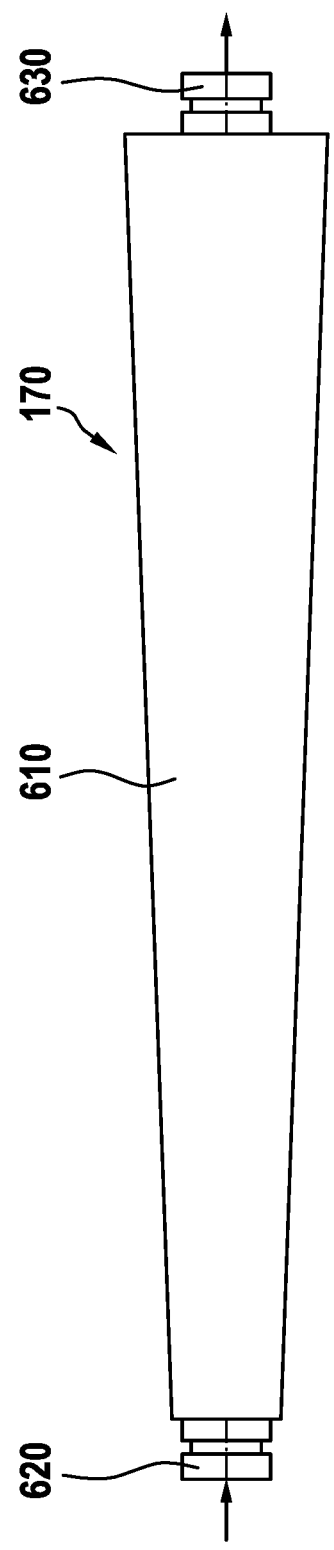

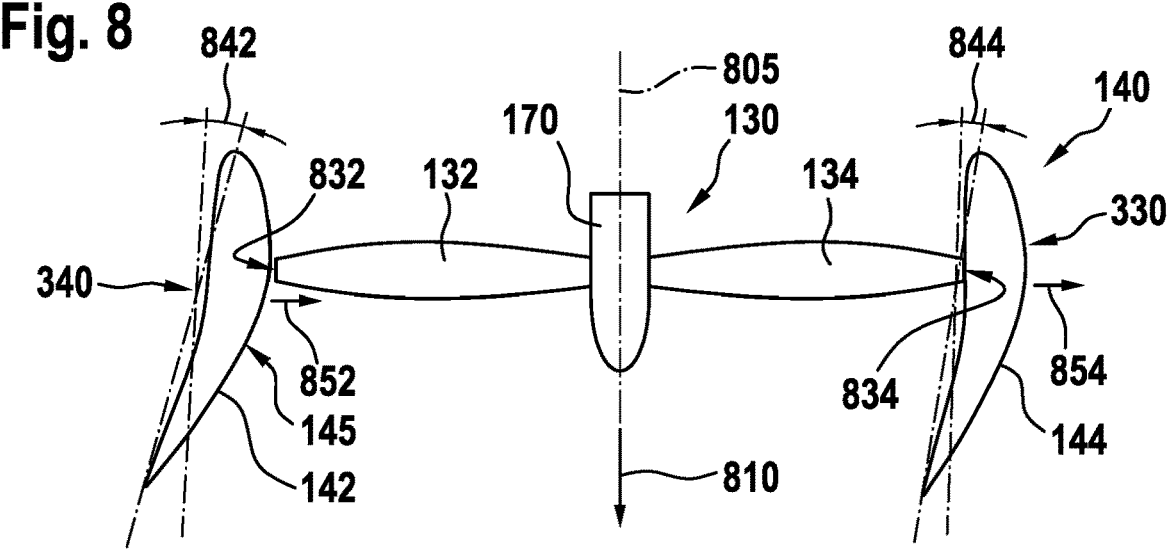
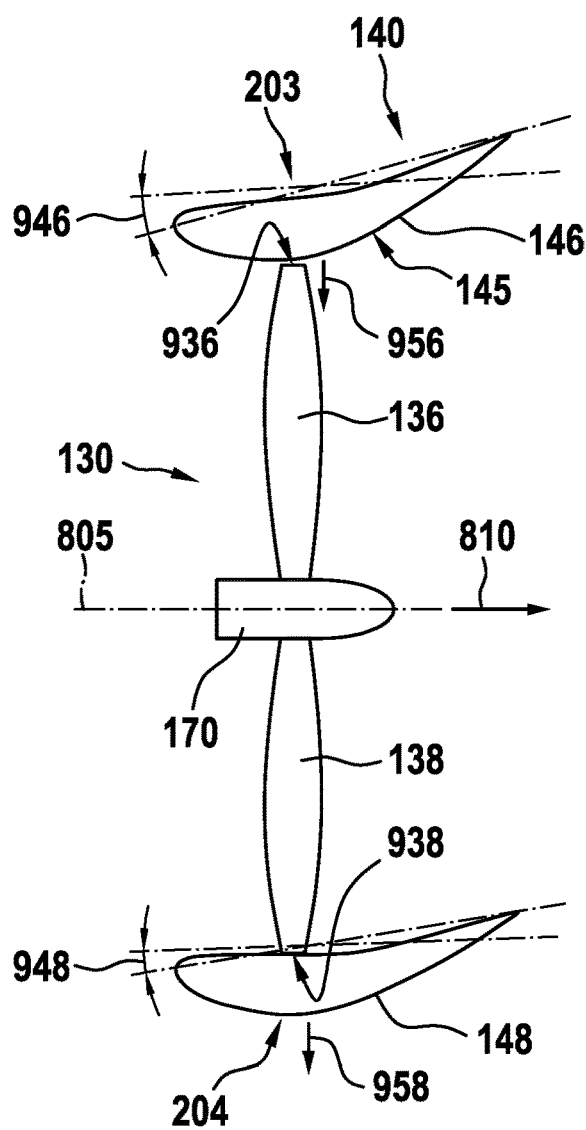

ROTARY WING AIRCRAFT WITH A SHROUDED TAIL PROPELLER

CROSS-REFERENCE TO RELATED APPLICATIONS

This application claims priority to European patent application No. EP 21400002.8 filed on Jan. 27, 2021, the disclosure of which is incorporated in its entirety by reference herein.

TECHNICAL FIELD

The present disclosure relates to a rotary wing aircraft that extends along an associated roll axis between a nose region and an aft region and that comprises a fuselage with a front section and a rear section, wherein the rotary wing aircraft further comprises a main rotor that is at least configured to provide lift in hover condition of the rotary wing aircraft, and a propeller that is at least configured to propel the rotary wing aircraft in forward flight condition.

BACKGROUND

An example for a rotary wing aircraft with a main rotor and a propeller is a so-called compound helicopter. In such a compound helicopter, the main rotor accomplishes essentially lifting duties, but usually also accomplishes propulsive duties at least at low or medium forward speeds in forward flight condition of the compound helicopter. The propeller, in turn, is mainly provided to off-load the main rotor from its propulsive duties at higher forward speeds in forward flight condition and may enable the compound helicopter to travel with comparatively high forward speeds which would not be reachable by use of the main rotor alone.

However, in operation the main rotor creates torque around the yaw axis of the compound helicopter. This torque must be counteracted by a suitable anti-torque device to guarantee a required yaw stability of the compound helicopter in flight operation.

The document U.S. Pat. No. 3,241,791 describes a compound helicopter with a main rotor and a tail propeller. The tail propeller is mounted to a circular shroud which is attached to the compound helicopter's fuselage. The circular shroud is further provided with a rudder that is pivotally mounted to the circular shroud downstream of the tail propeller. In operation, the tail propeller creates an air stream which is directed through the circular shroud toward the rudder and which may be deflected by the rudder to counteract the torque created by the main rotor.

The document U.S. Pat. No. 4,928,907 describes a compound helicopter with a main rotor, a tail boom, and a tail propeller mounted to an aft region of the tail boom, wherein the tail propeller is used only for forward thrust during an airplane mode of flight and during transition from vertical helicopter flight to forward airplane mode of flight, when the main rotor may be feathered in a no-lift attitude. Required anti-torque balancing forces during hovering mode are developed by differentially controlled aileron forces when respective wings are aligned vertically with main rotor downwash. Furthermore, a vertically moveable horizontal airfoil is provided on the tail boom, with controllable means which can provide anti-torque reaction forces from the main rotor downwash during the hovering mode.

The document EP 1 395 489 A2 describes a compound helicopter with a main rotor, a tail propeller, and a tail boom. The tail boom forms a plenum chamber to which associated linear nozzles are connected. The associated linear nozzles are fixedly coupled to the tail boom and adapted to discharge a sheet of fluid created from pressurized air in the plenum chamber in a direction substantially tangential to an outer surface of the tail boom to divert main rotor downwash and thereby produce a force that counteracts biasing torque created by the main rotor. The pressurized air is provided by a fan or by directing exhaust air from a power plant of the compound helicopter into the plenum chamber. The compound helicopter further comprises a yaw control member which is movably coupled to the tail boom and selectively positionable based on pilot input.

The document EP 2 511 177 A1 describes a compound helicopter with a main rotor, a tail propeller, and a tail boom that is surrounded by a cycloidal rotor. The cycloidal rotor has individual blades which are essentially parallel to the longitudinal axis of the tail boom. In operation, the cycloidal rotor is driven to provide anti-torque that counteracts biasing torque created by the main rotor.

However, the above-described anti-torque devices for compound helicopters with a main rotor and a propeller are generally complex and require actuatable components, such as differentially controlled ailerons or moveable airfoils, additional fans, pilot-moveable yaw control members, or cycloidal rotors. These actuatable components increase an overall system complexity and an overall weight of these anti-torque devices.

Various other anti-torque devices are known from conventional helicopters which, in contrast to the above-described compound helicopters, are not provided with a propeller. In such conventional helicopters, wherein a respective main rotor creates torque around the helicopter's yaw axis, usually a tail rotor is provided as anti-torque device to provide anti-torque that counteracts the torque created by the respective main rotor. Moreover, as main rotor downwash of such a conventional helicopter generally flows around its tail boom, the tail boom may be provided with additional anti-torque devices in the form of strakes or vortex generators to alter the flow of downwash in order to generate a compensation force that counteracts at least partially the torque created by the respective main rotor such that a respective down-sizing of the tail rotor is enabled. Furthermore, a fairing may be added as additional anti-torque device to the tail boom of such a conventional helicopter to create the compensation force, or the profile of the tail boom as such may be modified. Other additional anti-torque devices may likewise be added to the tail boom, such as e. g. a rotating cylinder that uses the so-called Magnus effect, to generate the compensation force. Illustrative conventional helicopters with main rotors, tail rotors and such additional anti-torque devices are described in the documents EP 3 317 180 A2, WO 2014/176431 A1, and U.S. Pat. No. 5,209,430 A.

If a respectively created compensation force suffices to counteract biasing torque created by the main rotor, it is also possible to omit provision of the tail rotor. Illustrative helicopters with a main rotor and an anti-torque device that enables omission of a respective tail rotor are described in the documents FR 2 897 040 A1, RU 2 282 565 C2, and U.S. Pat. No. 2,452,355 A.

Nevertheless, most of the above-described anti-torque devices of conventional helicopters are not suitable for use in a compound helicopter with a main rotor and a tail propeller as they require presence of a conventional tail rotor. However, a conventional tail rotor has usually a comparatively high power consumption, especially in hover condition, and is quite noisy. In contrast, the above-described anti-torque devices which do not need presence of a conventional tail rotor are bulky and/or require actuatable components, such as additional fans, rotatable truncated cones or rotatable cylinders. These actuatable components, however, increase an overall system complexity and an overall weight of the anti-torque devices.

SUMMARY

It is, therefore, an object of the present disclosure to provide a new compound helicopter and, more generally, a new rotary wing aircraft with a main rotor and a tail propeller, which is equipped with an improved anti-torque device that exhibits a comparatively low overall system complexity and a reduced overall weight.

This object is solved by a rotary wing aircraft with a main rotor and a tail propeller, the rotary wing aircraft comprising the features of claim 1. More specifically, according to the present disclosure a rotary wing aircraft is provided that extends along an associated roll axis between a nose region and an aft region and that comprises a fuselage with a front section and a rear section. The rotary wing aircraft comprises a main rotor that is at least configured to provide lift in hover condition of the rotary wing aircraft; a shrouded duct that is arranged in the aft region and that forms an inner air duct, wherein the shrouded duct is formed to generate sideward thrust for main rotor anti-torque in forward flight condition of the rotary wing aircraft; and a propeller that is at least configured to propel the rotary wing aircraft in the forward flight condition. The propeller comprises a predetermined number of propeller blades with associated blade tips which form a circular propeller disc in rotation of the propeller around an associated rotation axis. The propeller is rotatably mounted to the shrouded duct such that the circular propeller disc is at least essentially arranged inside of the inner air duct. The shrouded duct comprises at least a first airfoil-shaped profile and a second airfoil-shaped profile which are arranged on diametrically opposed sides of the shrouded duct. Furthermore, the first and second airfoil-shaped profiles are formed with different angles of attack relative to the associated rotation axis of the propeller.

Advantageously, by forming the shrouded duct such that it generates sideward thrust for main rotor anti-torque at least in forward flight condition of the rotary wing aircraft, but preferably also in transition from hover condition to forward flight, a passive anti-torque device may be provided which requires only actuation for relatively small control forces without forced control, thereby avoiding the weight and the need for redundancy of an active system. More particularly, this passive anti-torque device may be provided with a reduced overall system complexity such that a required maintenance effort for the anti-torque device will be comparatively low.

Preferably, the shrouded duct has a particular form and shaping, e. g. with respect to a non-circular cross section, a variable length, different angles of attack, varying distances of leading/trailing edges to a respective propeller blades' plane, etc. Such a particular form and shaping advantageously enable the shrouded duct to generate sideward thrust for main rotor anti-torque in transition and forward flight condition of the rotary wing aircraft.

More specifically, the shrouded duct may have an inclination in all directions. In other words, a respective leading edge of the shrouded duct may be inclined positive or negative in top and side view, as well as in other views between top and side view.

In addition, or alternatively, the shrouded duct may be formed by means of a profile with a length that may vary in circumferential direction of the shrouded duct. In addition, or alternatively, the shrouded duct's profile may be asymmetrical with respect to the rotary wing aircraft's roll axis, and may exhibit different angles of attack on the port side and the starboard side of the shrouded duct. In addition, or alternatively, the shape and/or thickness of the shrouded duct's profile may vary around the shrouded duct, i. e. in circumferential direction of the shrouded duct. This applies similarly for respective upper and lower sides of the shrouded duct for clear control stability around the rotary wing aircraft's pitch axis, similar to the function of the horizontal area.

Moreover, the shrouded duct's profile may have a varying distance from the circular propeller disc of the propeller. Furthermore, the shrouded duct may at least partly be reduced in length by means of a cut-out. In addition, or alternatively, a varying distance of the shrouded duct's leading edge to the circular propeller disc may be foreseen.

In other words, preferably the shape of the shrouded duct's profile, the length of the profile, the angle of attack of the profile with respect to the propeller's rotation axis, and/or the distance of the leading edge of the profile with respect to the circular propeller disc of the propeller may be adapted for an improved generation of sideward thrust for main rotor anti-torque by means of the shrouded duct, at least in transition and forward flight condition of the rotary wing aircraft. Furthermore, it will be adapted for a reduced drag caused by the downwash of the main rotor downstream in combination to areas of the duct more or less perpendicular to this downwash. The latter is valid more for the transition flight.

In one exemplary realization of the rotary wing aircraft, additional sideward thrust for main rotor anti-torque may be generated from main rotor downwash by means of at least one source of asymmetry. For instance, the at least one source of asymmetry may be located to a side of the rotary wing aircraft that is closest to an approaching rotor blade of the main rotor in the sense of rotation of the main rotor. In other words, if the main rotor rotates in counterclockwise direction, the at least one source of asymmetry is located at the starboard side, i. e. the right-hand side of the fuselage of the rotary wing aircraft, which is preferably formed as a compound helicopter with the main rotor and the propeller.

By way of example, the at least one source of asymmetry may be formed as a protruding edge of the fuselage that may be arranged close to a lower side of the fuselage. Such a protruding edge may be formed sufficiently large in order to be usable as a step. Furthermore, it may e. g. be integrated into an aerodynamically shaped skid landing gear. Alternatively, such a protruding edge may be built by a cover of a retractable nose landing gear. In this case, an aerodynamic performance of the compound helicopter in fast forward flight will not be affected by the protruding edge, as it will be retracted into the fuselage together with the retractable nose landing gear such that the overall configuration is aerodynamically clean again. In fact, generation of respective anti-torque using the protruding edge preferably mainly occurs in hover condition and slow forward flight.

The at least one source of asymmetry may further include an elongation, i. e. a convex projection on top of the fuselage of the compound helicopter, i. e. at an upper side of the fuselage. A suitable elongation may e. g. be obtained by an appropriate shaping of an upper cowling that covers an upper deck of the compound helicopter. A highest point of the upper cowling may be shifted to an opposite side of the fuselage such that there is a smooth transition, at least with tangent constancy in the upper area of the cross section.

Moreover, in order to further increase generation of sideward thrust for main rotor anti-torque from main rotor downwash, the rear section of the fuselage of the compound helicopter may exhibit a shape that is similar to a profile of a so-called high lift airfoil such that comparatively high sideward thrust may already be generated at comparatively low downwash air speed. Preferably, at least the main part of the rear section of the fuselage is asymmetrically located to a side of the compound helicopter that is farther away from an approaching rotor blade of the main rotor in the sense of rotation of the main rotor. In other words, if the main rotor rotates in counterclockwise direction, the main part of the rear section of the fuselage is located at the starboard side of the compound helicopter.

Preferably, a vertical cut through the rear section of the fuselage at a position that is close to the aft region of the compound helicopter resembles to a high lift airfoil. This high lift airfoil is orientated at that position preferably at least approximately in vertical direction providing "lift", i. e. sideward thrust in the same direction in which the main rotor is rotating. In other words, if the main rotor rotates in counterclockwise direction, the sideward thrust likewise points into this direction.

Thus, less power is needed in hover condition as generation of downward drag in response to main rotor downwash is reduced due to a transformation of the main rotor downwash into sideward thrust, compared to the downward drag that is created by a conventional tail boom in response to main rotor downwash. Consequently, a gain of lifting capacity and fuel savings may be realized.

Advantageously, a transition in the region of the main rotor, preferably in a region between the main rotor and the rear section of the fuselage, from a cross-sectional profile of the compound helicopter's fuselage, which may be symmetrical similar to a cross-sectional profile of a conventional helicopter, to the high lift airfoil-shaped cross-sectional profile of the rear section of the fuselage may be embodied as a smooth recess. The latter is preferably shaped in order to avoid airflow separation.

In an illustrative realization, the rear section is provided in the aft region with the shrouded duct, to which the propeller is rotatably mounted. An underlying transition of the rear section of the fuselage to the shrouded duct is preferably smooth, such that the rear section of the fuselage has at least approximately a shaping that corresponds to one quarter of the shrouded duct.

Furthermore, at least one wing-type aerodynamic device, which is also referred to as the "support wing" hereinafter, may be associated with the rear section of the fuselage for additional generation of sideward thrust for main rotor anti-torque from main rotor downwash. In operation of the compound helicopter, a certain amount of main rotor downwash is present mainly in hover condition. Therefore, "lift" in horizontal direction, i. e. sideward thrust, may advantageously be generated simultaneously by the rear section of the fuselage, the associated support wing, as well as the front section and the shrouded duct, from the main rotor downwash in order to counteract the torque created by the main rotor in the hover condition.

Preferably, the support wing is mainly oriented vertically. More specifically, the support wing may connect the compound helicopter's upper deck to the shrouded duct, e. g. from slightly behind of the main rotor to the shrouded duct. Advantageously, the support wing also exhibits a shape that is similar to a profile of a high lift airfoil. Preferably, the support wing has its greatest width at an area located between 60% of the length of the main rotor's rotor blades and an outer end of the rotor blades.

Advantageously, the support wing and the rear section of the fuselage support the shrouded duct on both sides of the compound helicopter, as there is no center part of the rear section of the fuselage, compared to a conventional tail boom. Preferably, a tail propeller drive shaft is arranged between the support wing and the rear section of the fuselage. This tail propeller drive shaft may also generate sideward thrust via the so-called Magnus effect, which occurs if a cylinder or cone is rotated in an airflow that is oriented perpendicular to its rotation axis.

The tail propeller drive shaft is preferably rotatably mounted to the shrouded duct, preferentially via a bearing that is supported by a predetermined number of provided stator profiles, such as e. g. three stator profiles. Preferably the stator profiles are mounted to the shrouded duct close to a respective location of the support wing and upper and lower edges of the rear section of the fuselage, where it is connected to the shrouded duct.

Alternatively, instead of providing a tail propeller drive shaft, the tail propeller may be powered independent of the main rotor, e. g. by means of a separate engine. This separate engine may be of a different type than a respective main engine that powers the main rotor such that engine hybridization is enabled with high redundancy, as the compound helicopter may be operated in forward flight with each one of the engines independent of the other one.

According to some aspects, the angle of attack of the first airfoil-shaped profile is greater than the angle of attack of the second airfoil-shaped profile.

According to some aspects, the first and second airfoil-shaped profiles are formed with different lengths in a direction parallel to the associated rotation axis of the propeller.

According to some aspects, the length of the first airfoil-shaped profile is smaller than the length of the second airfoil-shaped profile.

According to some aspects, the first and second airfoil-shaped profiles comprise associated leading edges that are spaced apart with different distances from the circular propeller disc in a direction parallel to the associated rotation axis of the propeller.

According to some aspects, the different distances vary along a circumference of the shrouded duct.

According to some aspects, the shrouded duct comprises at least a third airfoil-shaped profile and a fourth airfoil-shaped profile, wherein the third and fourth airfoil-shaped profiles are arranged on diametrically opposed sides of the shrouded duct respectively between the first and second airfoil-shaped profiles, and wherein the third and fourth airfoil-shaped profiles are connected via smooth transitions to the first and second airfoil-shaped profiles.

According to some aspects, the shrouded duct is formed as an undulated ring.

According to some aspects, the inner air duct is formed with a circular shape in the region of the circular propeller disc and with a non-circular shape otherwise.

According to some aspects, the rear section of the fuselage extends between the front section and the shrouded duct and comprises an asymmetrical cross-sectional profile in direction of the associated roll axis that is configured to generate sideward thrust for main rotor anti-torque from main rotor downwash, and/or the rear section comprises at least one airfoil-shaped aerodynamic device that extends from the front section to the aft region, wherein the at least one airfoil-shaped aerodynamic device is configured to generate sideward thrust for main rotor anti-torque from main rotor downwash.

According to some aspects, the rotary wing aircraft further comprises at least one source of asymmetry that is connected to the front section of the fuselage such that the front section comprises at least in sections an asymmetrical cross-sectional profile in direction of the associated roll axis, wherein the at least one source of asymmetry is configured to generate sideward thrust for main rotor anti-torque from main rotor downwash.

According to some aspects, the rotary wing aircraft further comprises an uncovered propeller drive shaft, in particular a cylinder shaft or a conical shaft, that is configured to generate sideward thrust for main rotor anti-torque via a Magnus effect upon rotation in main rotor downwash.

By using an uncovered propeller drive shaft, provision of a respective drive shaft cowling may be omitted. Thus, an overall weight and respective costs of the compound helicopter may advantageously be reduced. Preferably, the uncovered tail propeller shaft is inclined and may have an offset to the roll axis of the compound helicopter seen from above.

According to some aspects, the rotary wing aircraft is embodied as a compound helicopter, wherein the front section of the fuselage forms a cabin for passengers and/or cargo, wherein the propeller is a pusher propeller, and wherein the main rotor forms a single rotor plane.

Thus, an improved compound helicopter with a reduced total number of constituting components and a reduced overall system complexity may be provided. This improved compound helicopter is embodied for an efficient cruise flight and enables higher flight speeds than usually achievable with conventional compound helicopters.

Preferred embodiments of the disclosure are outlined by way of example in the following description with reference to the attached drawings. In these attached drawings, identical or identically functioning components and elements are labeled with identical reference numbers and characters and are, consequently, only described once in the following description.

BRIEF DESCRIPTION OF THE DRAWINGS

FIG. 5 shows a side view of a propeller drive shaft of the rotary wing aircraft of FIG. 1 to FIG. 4 according to one aspect, FIG. 6 shows a side view of a propeller drive shaft of the rotary wing aircraft of FIG. 1 to FIG. 4 according to another aspect, FIG. 8 shows a sectional view of the propeller and the shrouded duct of FIG. 1 to FIG. 4, seen along a horizontal cutting line VIII-VIII in FIG. 3, FIG. 9 shows a sectional view of the propeller and the shrouded duct of FIG. 1 to FIG. 4, seen along a vertical cutting line IX-IX in FIG. 2.

DETAILED DESCRIPTION

Figure 1:
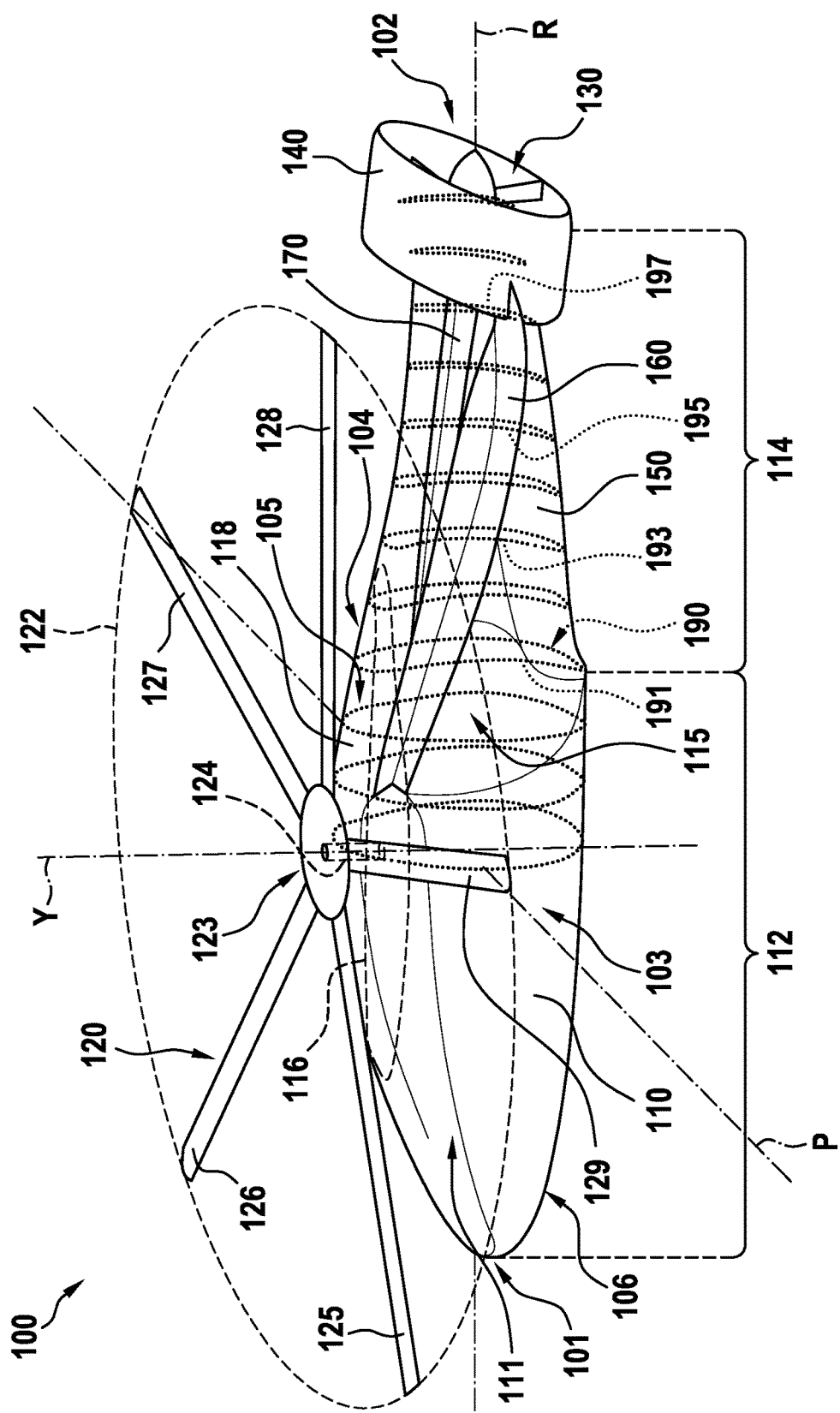
FIG. 1 shows a perspective view of a rotary wing aircraft with a propeller and a shrouded duct according to the present disclosure.

FIG. 1 shows an illustrative rotary wing aircraft 100 with a fuselage 110 and a main rotor 120. By way of example, the rotary wing aircraft 100 is shown with three mutually orthogonal axes P, R, and Y. The axis P represents a transversal axis that corresponds to the pitch axis inherent to the rotary wing aircraft 100, the axis R represents a longitudinal axis that corresponds to the roll axis inherent to the rotary wing aircraft 100, and the axis Y represents a vertical axis that corresponds to the yaw axis inherent to the rotary wing aircraft 100.

By way of example, the rotary wing aircraft 100 is illustrated in forward flight. Thus, only components that are required for forward flight are illustrated in more detail, while illustration of other components is omitted, for simplicity and clarity of the drawing. For instance, neither the fuselage 110 is illustrated in greater detail for showing e. g. respective doors and windows, nor a possible landing gear, which may be a wheel-type landing gear or a skid-type landing gear mounted to the fuselage 110, is shown, and so on.

Illustratively, the fuselage 110 extends along the roll axis R from a nose region 101 to an aft region 102 of the rotary wing aircraft 100. The fuselage 110 comprises a front section 112 and a rear section 114. Illustratively, the front section 112 comprises a port side wall 103 and a starboard side wall 104. Preferably, the rear section 114 extends in prolongation to one of the port side wall 103 or the starboard side wall 104.

More specifically, the rear section 114 preferably extends in prolongation to a side of the fuselage 110 that is farther away from an approaching rotor blade of the main rotor 120 in the sense of rotation of the main rotor 120. Assuming that the main rotor 120 rotates in counterclockwise direction, the rear section 114 of the fuselage 110 would be located at the starboard side of the rotary wing aircraft 100 and, thus, be arranged in prolongation to the starboard side wall 104 as illustrated.

By way of example, the front section 112 merges into the rear section 114 at an associated transition or recess area 115. In other words, starting at the nose region 101 of the fuselage 110 and travelling along the roll axis R, the fuselage 110 has the front section 112 that merges at the transition or recess area 115 into the rear section 114 that, in turn, terminates in the aft region 102.

The front section 112 preferably forms a cabin 111 for passengers and/or cargo. The cabin 111 and, more generally, the fuselage 110 illustratively extends in direction of the yaw axis Y from a lower side 106 to an upper limit 116 that separates the cabin 111 from an upper deck 105. The upper deck 105 is preferably covered by a cowling 118. By way of example, the cowling 118 may cover one or more suitable engines and a main gear box that rotates the main rotor 120 in operation. Accordingly, the main rotor 120 is rotatably mounted at the front section 112 of the fuselage 110.

Preferably, the main rotor 120 is at least configured to provide lift in hover condition of the rotary wing aircraft 100. By way of example, the main rotor 120 forms a single rotor plane 122 and is adapted to provide lift and forward or backward thrust during operation. Illustratively, the main rotor 120 is embodied as a multi-blade main rotor with a plurality of rotor blades 125, 126, 127, 128, 129 which are coupled at an associated rotor head 123 to a rotor mast 124, which rotates in operation of the rotary wing aircraft 100 around an associated rotor axis.

According to one aspect, the rotary wing aircraft 100 is embodied as a compound helicopter with a propeller 130 that is at least configured to propel the rotary wing aircraft 100 in forward flight condition. Accordingly, the rotary wing aircraft 100 is referred to hereinafter as the "compound helicopter 100", for simplicity and clarity.

The propeller 130 and the main rotor 120 may be driven completely independent from each other. In particular, different types of engines may be used to drive the propeller 130 and the main rotor 120, such as e. g. an air breathing propulsion engine for the main rotor 120 and an electric motor for the propeller 130.

Preferably, the propeller 130 is rotatably mounted to a shrouded duct 140 at the rear section 114 of the fuselage 110 in the aft region 102 of the compound helicopter 100. The propeller 130 may be mounted by any suitable means to the shrouded duct, such as e. g. suitable stator profiles. The shrouded duct 140 is illustratively formed to generate at least sideward thrust (852, 854 in FIG. 8) for main rotor anti-torque in the forward flight condition.

More specifically, the shrouded duct 140 is preferably mounted to the rear section 114 and arranged in the aft region 102 of the compound helicopter 100. Accordingly, the propeller 130 forms a tail propeller and, more particularly, preferably a pusher propeller.

The rear section 114 of the fuselage 110 illustratively extends between the front section 112 of the fuselage 110 and the shrouded duct 140. The rear section 114 may comprise an asymmetrical cross-sectional profile 190 in direction of the roll axis R of the compound helicopter 100 and may be configured to generate sideward thrust for main rotor anti-torque from main rotor downwash. By way of example, the asymmetrical cross-sectional profile 190 is at least approximately C-shaped, as illustrated with a series of cross-sectional profiles 191, 193, 195, 197.

In addition, or alternatively, the rear section 114 may comprise at least one airfoil-shaped aerodynamic device 150 that extends from the front section 112 to the aft region 102 and, more particularly, to the shrouded duct 140. By way of example, only one airfoil-shaped aerodynamic device 150 is shown. This airfoil-shaped aerodynamic device 150 is illustratively arranged in prolongation to the starboard side wall 104.

In an illustrative realization, the airfoil-shaped aerodynamic device 150 is formed as, or by, a wing. This wing is, however, not arranged transversally to the roll axis R, but instead at least approximately in parallel to the roll axis R.

The airfoil-shaped aerodynamic device 150 may form the rear section 114, at least partly. More particularly, the airfoil-shaped aerodynamic device 150 may be configured to generate sideward thrust for main rotor anti-torque from main rotor downwash.

The rear section 114 may further comprise at least one wing-type aerodynamic device 160 that extends between the front section 112 and the shrouded duct 140. By way of example, only one wing-type aerodynamic device 160 is shown. Illustratively, the wing-type aerodynamic device 160 is at least approximately arranged in prolongation to the port side wall 103.

Preferably, the wing-type aerodynamic device 160 is mounted to the shrouded duct 140 and to the upper deck 105 of the compound helicopter 100. Illustratively, the wing-type aerodynamic device 160 and the airfoil-shaped aerodynamic device 150 are connected to opposite sides of the shrouded duct 140. The wing-type aerodynamic device 160 may also be configured to generate sideward thrust for main rotor anti-torque from main rotor downwash of the compound helicopter 100.

Illustratively, the compound helicopter 100 further comprises an uncovered propeller drive shaft 170, in particular a cylinder shaft as described below at FIG. 5 or a conical shaft as described below at FIG. 6, that is configured to create a Magnus effect upon rotation in main rotor downwash. The uncovered propeller drive shaft 170, and likewise the shrouded duct 140, may be inclined and may have an offset to the roll axis R of the compound helicopter 100 seen from above. Preferably, the uncovered propeller drive shaft 170 is configured to drive the propeller 130 in operation and, illustratively, extends coupling- and bearing-free between the front section 112 of the fuselage 110 and the propeller 130, i. e. without intermediate coupling(s) and bearing(s).

The front section 112, in turn, may comprise one or more sources of asymmetry, as described below at FIG. 4. This source of asymmetry may also be configured to generate sideward thrust for main rotor anti-torque from main rotor downwash of the compound helicopter 100.

Figure 2:
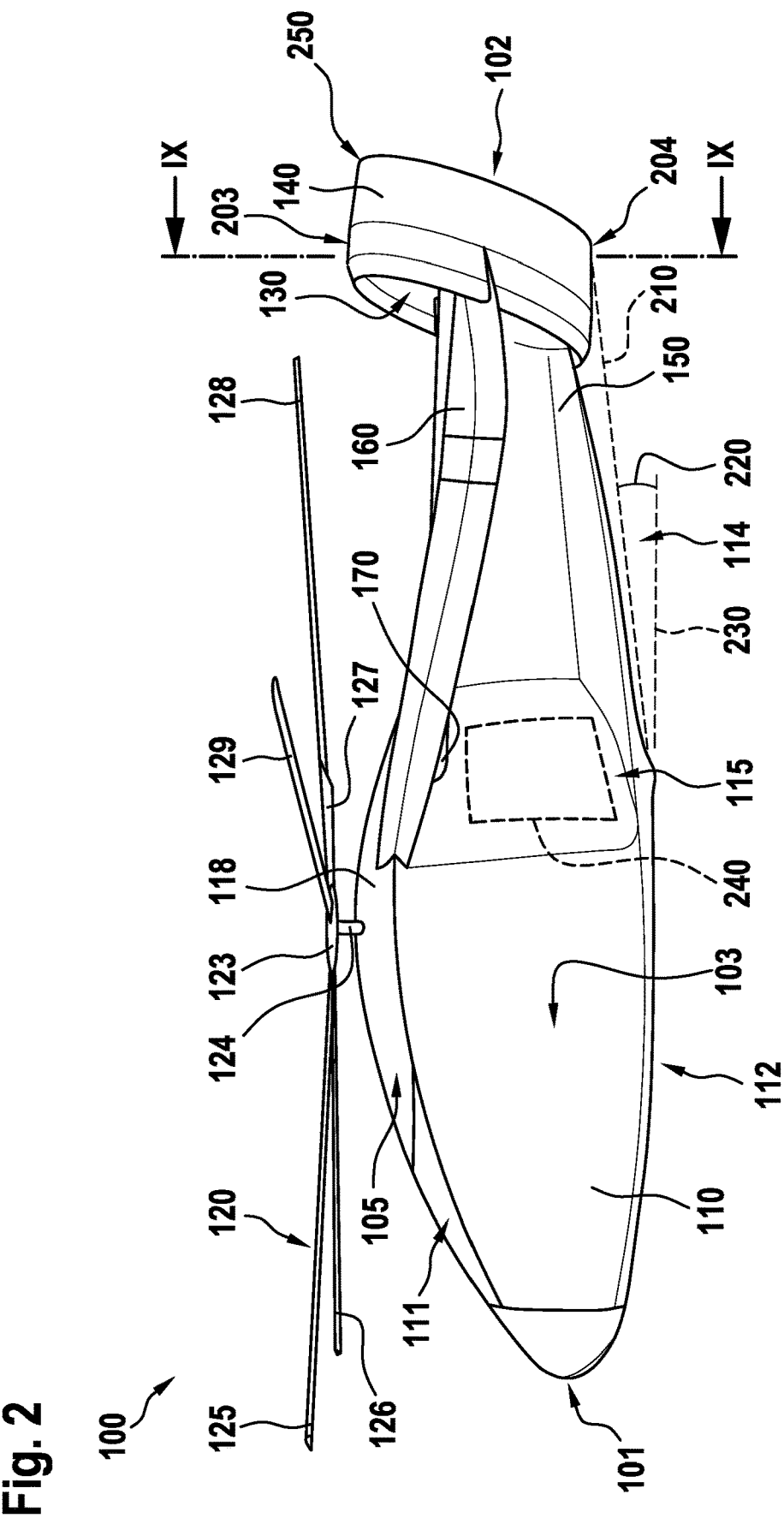
FIG. 2 shows a side view of the rotary wing aircraft of FIG. 1.

FIG. 2 shows the compound helicopter 100 of FIG. 1 with the fuselage 110, the main rotor 120, the propeller 130, the shrouded duct 140, and the uncovered propeller drive shaft 170. According to FIG. 1, the fuselage 110 comprises the front section 112 that merges at the recess area 115 into the rear section 114, the rear section 114 comprises the airfoil-shaped aerodynamic device 150 and the wing-type aerodynamic device 160, the propeller 130 is rotatably mounted to the shrouded duct 140 and driven by the uncovered propeller drive shaft 170, and the wing-type aerodynamic device 160 connects the upper deck 105 to the shrouded duct 140.

According to one aspect, the shrouded duct 140 forms a swept back structure 250 and illustratively comprises an upper side 203 and a lower side 204. This swept back structure 250 is preferably provided to adapt main rotor downwash at the shrouded duct 140 to a preferred behavior of the compound helicopter 100 during transition from hover condition to forward flight.

Illustratively, a bottom line 210 of the rear section 114 of the fuselage 110 is shown, which extends along the rear section 114 up to the lower side 204 of the shrouded duct 140. This bottom line 210 is preferably angled by a predetermined inclination angle 220 relative to a horizontal reference plane 230. By way of example, the predetermined inclination angle 220 is a positive (dihedral) angle that may be selected dependent on a required sideward thrust that is to be generated by the rear section 114 of the fuselage 110 in operation.

It should, nevertheless, be noted that the dihedral angle is only shown and described by way of example and not for restricting the present disclosure accordingly. Moreover, it should be noted that instead of selecting the illustrative dihedral angle e. g. a negative (anhedral) angle may likewise be selected for the predetermined inclination angle 220. In this case, an increase of up to 30% of generated sideward thrust may be obtained, resulting in a possibly achievable increase of more than 40% of a respectively generated counteracting moment.

Furthermore, according to one aspect a rear door 240 and/or additional equipment, such as e. g. a winch, may be arranged in the recess area 115. The rear door 240 may e. g. be a sliding or dual cantilever door. By way of example, the rear door 240 may be slidable into the fuselage 110, i. e. toward the cabin 111. Thus, in forward flight with opened door, there is no additional drag generated by the rear door 240.

Preferably, this rear door 240 is accessible from a rear side of the compound helicopter 100, i. e. coming from the rear section 114. Thus, the compound helicopter's cabin 111 may be loaded from the rear side. Advantageously, by positioning the rear door 240 in the recess area 115, penalties to the overall aerodynamic performance of the compound helicopter 100 due to the rear door 240 may be avoided.

Figure 3:
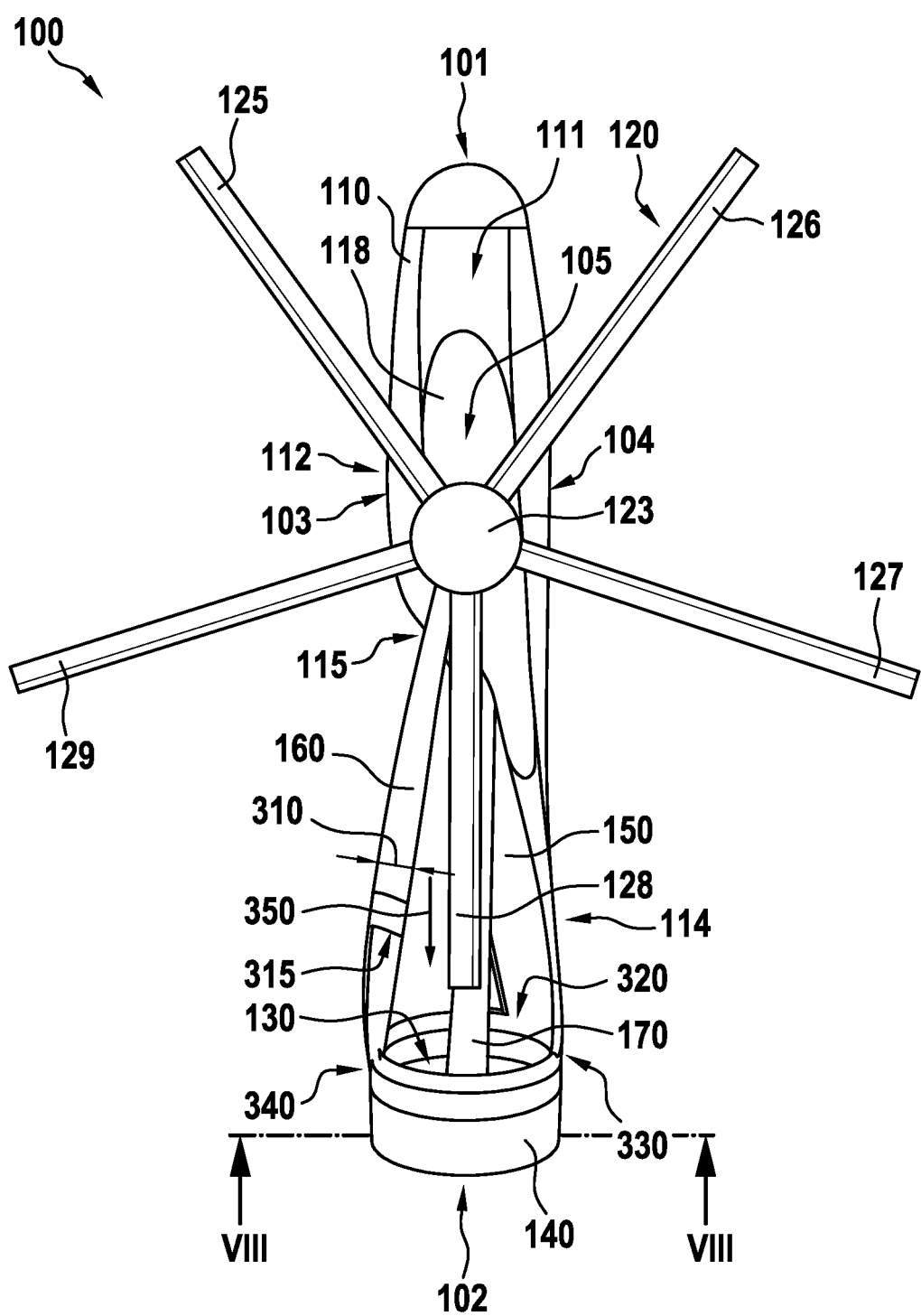
FIG. 3 shows a top view of the rotary wing aircraft of FIG. 1 and FIG. 2.

FIG. 3 shows the compound helicopter 100 of FIG. 1 and FIG. 2 with the fuselage 110, the main rotor 120, the propeller 130, the shrouded duct 140, and the uncovered propeller drive shaft 170. According to FIG. 1 and FIG. 2, the fuselage 110 comprises the front section 112 that merges at the recess area 115 into the rear section 114, the rear section 114 comprises the airfoil-shaped aerodynamic device 150 and the wing-type aerodynamic device 160, the main rotor 120 comprises the rotor blades 125, 126, 127, 128, 129 and the rotor head 123 which is arranged in the front section 112 of the fuselage 110, the propeller 130 is rotatably mounted to the shrouded duct 140 and driven by the uncovered propeller drive shaft 170, and the wing-type aerodynamic device 160 connects the upper deck 105 to the shrouded duct 140.

More particularly, FIG. 3 clarifies the arrangement of the main rotor 120 and its rotor head 123 in the front section 112 of the fuselage 110, as well as the merging of the front section 112 along the recess area 115 into the rear section 114 of the fuselage 110 by redirecting, i. e. deflecting the port side wall 103 of the compound helicopter 100 in the recess area 115 toward the starboard side wall 104. Furthermore, the connection of the airfoil-shaped aerodynamic device 150 and the wing-type aerodynamic device 160 to almost diametrically opposed sides 330, 340 of the shrouded duct 140, which correspond to the starboard side wall 104 side and the port side wall 103 side, is also clarified. Preferably, at least the connection of the airfoil-shaped aerodynamic device 150 to the shrouded duct 140 is formed as a smooth transition 320, preferentially over at least 25% of an overall perimeter of the shrouded duct 140.

By way of example, the wing-type aerodynamic device 160 has a width 310 that increases from the upper deck 105 over a predetermined length of the wing-type aerodynamic device 160. More specifically, the width 310 illustratively starts to increase at the upper deck 105 and increases in direction of the shrouded duct 140.

The width 310 may increase such that a maximum width value is reached at an area located between 60% of the length of the rotor blades 125, 126, 127, 128, 129 and their outer ends. Preferably, the width 310 increases over at least 75% of the length of the wing-type aerodynamic device 160. Illustratively, 75% of the length of the wing-type aerodynamic device 160 is reached at a location 315.

Figure 4:
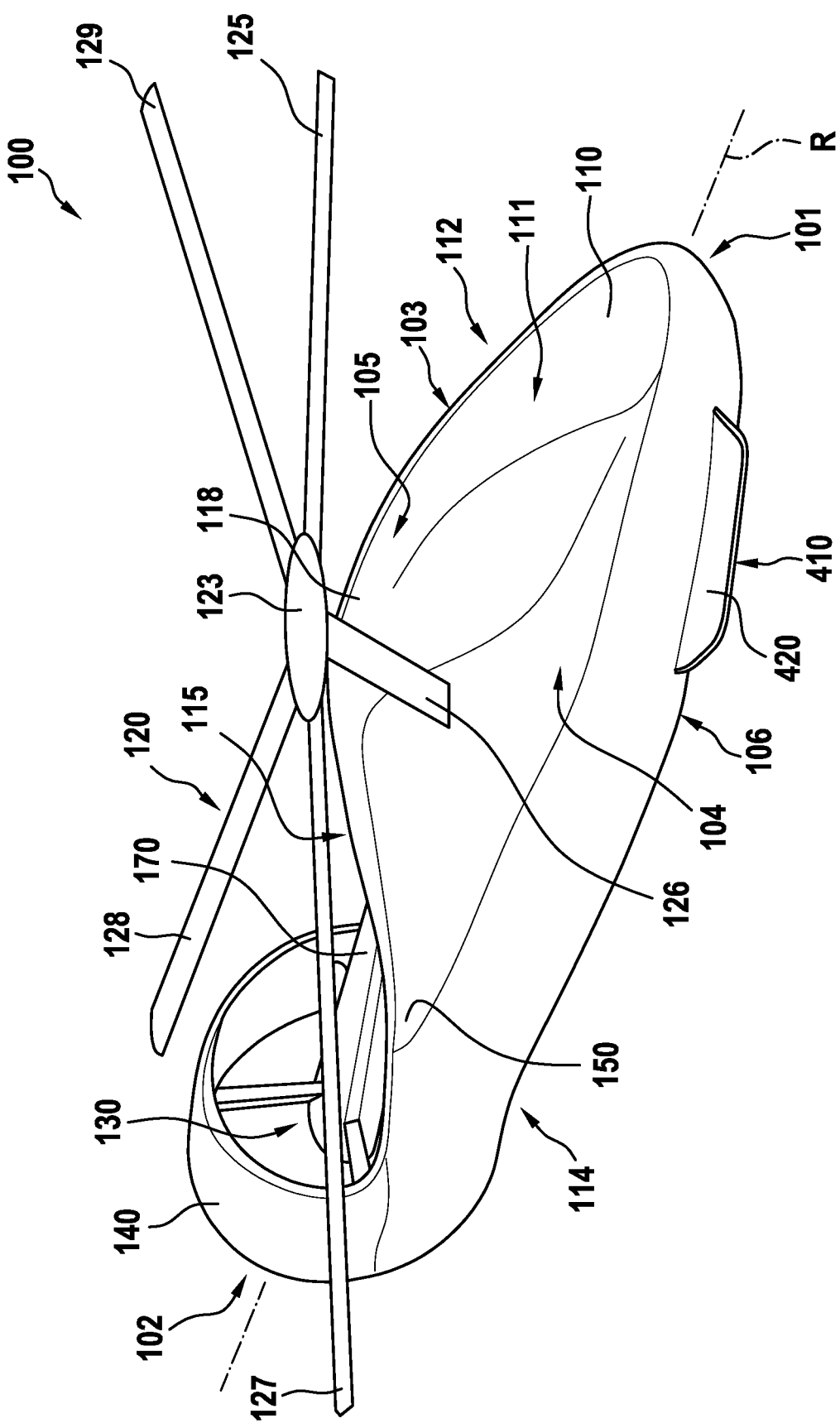
FIG. 4 shows another perspective view of the rotary wing aircraft of FIG. 1 to FIG. 3, with an illustrative source of asymmetry.

FIG. 4 shows the compound helicopter 100 of FIG. 1 to FIG. 3 with the fuselage 110, the main rotor 120, the propeller 130, the shrouded duct 140, and the uncovered propeller drive shaft 170. According to FIG. 1 to FIG. 3, the fuselage 110 comprises the front section 112 that merges at the recess area 115 into the rear section 114, the rear section 114 comprises the airfoil-shaped aerodynamic device 150, and the propeller 130 is rotatably mounted to the shrouded duct 140 and driven by the uncovered propeller drive shaft 170. However, illustration of the wing-type aerodynamic device 160 is omitted for simplicity and clarity of the drawing.

More particularly, FIG. 4 clarifies the connection of the airfoil-shaped aerodynamic device 150 to the shrouded duct 140. Furthermore, the merging of the front section 112 along the recess area 115 into the rear section 114 of the fuselage 110 by redirecting, i. e. deflecting the port side wall 103 of the compound helicopter 100 in the recess area 115 toward the starboard side wall 104 is also further clarified.

By way of example, at least one source of asymmetry 410 is connected to the front section 112, preferably close to the lower side 106 of the fuselage 110, such that the front section 112 comprises at least in sections an asymmetrical cross-sectional profile in direction of the associated roll axis R of FIG. 1. The at least one source of asymmetry 410 is preferably configured to generate sideward thrust for main rotor anti-torque from main rotor downwash.

The at least one source of asymmetry 410 may be formed as an integral part of the fuselage 110. Illustratively, the at least one source of asymmetry 410 is embodied as an integrally formed protruding edge of the fuselage 110. Alternatively, the at least one source of asymmetry 410 may be pivotable and/or retractable, e. g. retractable into the fuselage 110.

By way of example, the protruding edge is formed as a plate-shaped protrusion 420 of the fuselage 110. The plate-shaped protrusion 420 is illustratively integrally formed with the fuselage 110. The plate-shaped protrusion 420 may e. g. form an accessible step, for instance a step that is suitable to support passenger access into the cabin 111 of the compound helicopter 100.

FIG. 5 shows the uncovered propeller drive shaft 170 of FIG. 1 to FIG. 4 which, in an illustrative realization, comprises a big diameter cylinder shaft 510. This big diameter cylinder shaft 510 has preferably a diameter comprised in a range from 5 to 10 times the diameter of a conventional tail rotor drive shaft. Preferably, the big diameter cylinder shaft 510 enables creation of the so-called Magnus effect for generating additional sideward thrust in operation from main rotor downwash of the main rotor 120 of the compound helicopter 100 of FIG. 1 to FIG. 4.

As described above at FIG. 1, the uncovered propeller drive shaft 170 and, thus, the big diameter cylinder shaft 510 preferably extends coupling- and bearing-free between the front section 112 of the fuselage 110 and the propeller 130. For purposes of illustration, the big diameter cylinder shaft 510 is, therefore, shown with two suitable bearings 520, 530 at its axial ends, which are provided to rotatably support the big diameter cylinder shaft 510.

In order to enable the coupling- and bearing-free extension of the big diameter cylinder shaft 510 between the front section 112 of the fuselage 110 and the propeller 130, the big diameter cylinder shaft 510 must be sufficiently stiff for a reliable and secure functioning. This may be achieved by forming the big diameter cylinder shaft 510 using carbon composites, especially high modulus fiber.

FIG. 6 shows the uncovered propeller drive shaft 170 of FIG. 1 to FIG. 4 which, in another illustrative realization, comprises a big diameter conical shaft 610. This big diameter conical shaft 610 has preferably a largest diameter comprised in a range from 5 to 10 times the diameter of a conventional tail rotor drive shaft. Preferably, the big diameter conical shaft 610 also enables creation of the so-called Magnus effect for generating additional sideward thrust in operation from main rotor downwash of the main rotor 120 of the compound helicopter 100 of FIG. 1 to FIG. 4.

As described above at FIG. 1, the uncovered propeller drive shaft 170 and, thus, the big diameter conical shaft 610 preferably extends coupling- and bearing-free between the front section 112 of the fuselage 110 and the propeller 130. For purposes of illustration, the big diameter conical shaft 610 is, therefore, shown with two suitable bearings 620, 630 at its axial ends, which are provided to rotatably support the big diameter conical shaft 610. Preferably, the bearing 630 supports the big diameter conical shaft 610 at the propeller 130 of FIG. 1.

In order to enable the coupling- and bearing-free extension of the big diameter conical shaft 610 between the front section 112 of the fuselage 110 and the propeller 130, the big diameter conical shaft 610 must be sufficiently stiff for a reliable and secure functioning. This may be achieved by forming the big diameter conical shaft 610 using carbon composites, especially high modulus fiber.

Figure 7:
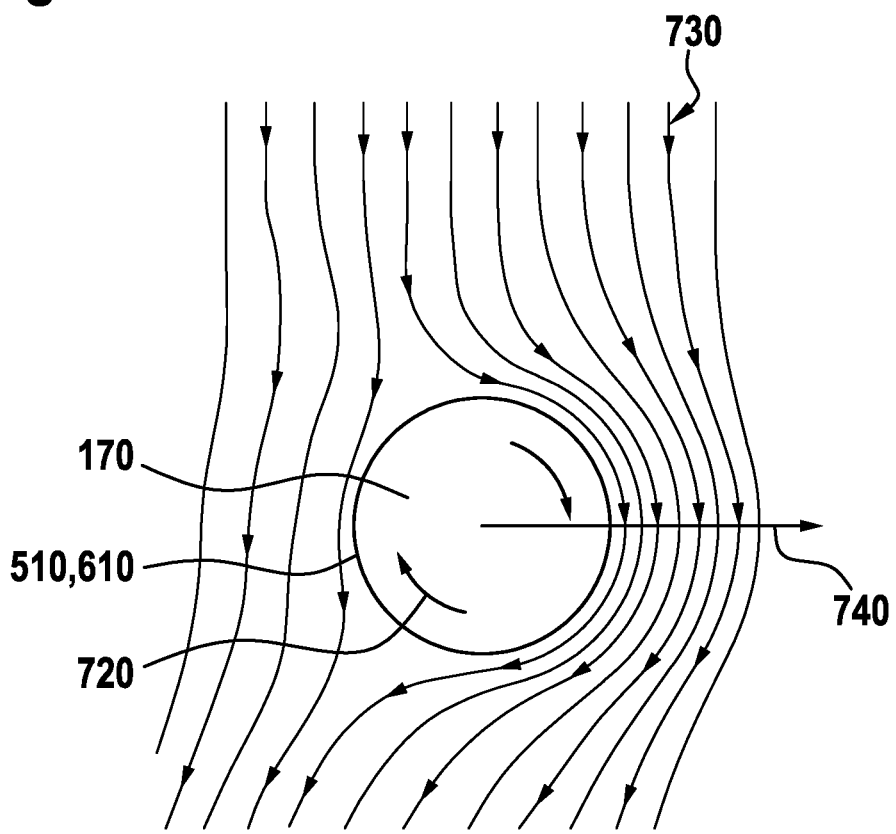
FIG. 7 shows a functional diagram of the propeller drive shaft of FIG. 5 and FIG. 6.

FIG. 7 shows the uncovered propeller drive shaft 170 of FIG. 1 to FIG. 4, which either comprises the big diameter cylinder shaft 510 of FIG. 5 or the big diameter conical shaft 610 of FIG. 6. In an illustrative operation of the main rotor 120 of the compound helicopter 100 of FIG. 1 to FIG. 4, the uncovered propeller drive shaft 170 is rotated in main rotor downwash 730 in a rotation direction 720. Thus, as a result of the Magnus effect, the uncovered propeller drive shaft 170 generates a sideward force 740. This sideward force 740, in turn, results in sideward thrust applied to the rear section 114 of the fuselage 110 of the compound helicopter 100 of FIG. 1 to FIG. 4.

It should be noted that the Magnus effect is well-known to the person skilled in the art. Therefore, for brevity and conciseness the Magnus effect and its application for generation of sideward thrust by means of the uncovered propeller drive shaft 170 is not described in more detail.

FIG. 8 shows the propeller 130 and the shrouded duct 140 of FIG. 1 to FIG. 4, seen along a cutting line VIII-VIII of FIG. 3. Accordingly, the diametrically opposed sides 330, 340 of the shrouded duct 140, which correspond to the starboard side wall side (104) and the port side wall side (103) of the shrouded duct 140 in FIG. 3, are further illustrated.

Illustratively, the shrouded duct 140 accommodates the propeller 130 which comprises a predetermined number of propeller blades. By way of example, two propeller blades 132, 134 are shown with associated blade tips 832, 834. The propeller blades 132, 134 rotate in operation around a rotation axis 805 in order to generate an airstream in a direction 810, which is hereinafter also referred to as the "airstream 810", for simplicity and brevity. The airstream 810 is preferably at least generated to propel the compound helicopter 100 of FIG. 1 to FIG. 4 in forward flight condition.

According to one aspect, the propeller 130 rotates at least partly, and illustratively entirely, inside of an inner air duct 145 formed by the shrouded duct 140. The shrouded duct 140 is preferably formed to generate sideward thrust 852, 854 for main rotor anti-torque in forward flight condition of the compound helicopter 100 of FIG. 1 to FIG. 4, at least partly by deviating the airstream 810, for provision of an increased yaw stability of the compound helicopter 100 of FIG. 1 to FIG. 4.

Illustratively, the shrouded duct 140 comprises at least first and second airfoil-shaped profiles. By way of example, the shrouded duct 140 comprises a first airfoil-shaped profile 142 and a second airfoil-shaped profile 144. By way of example, the airfoil-shaped profiles 142, 144 are arranged on the diametrically opposed sides 340, 330 of the shrouded duct 140 and comprise varying thicknesses over their respective lengths.

As illustrated, the airfoil-shaped profiles 142, 144 may be formed with different angles of attack 842, 844 relative to the rotation axis 805 of the propeller 130. By way of example, the angle of attack 842 of the airfoil-shaped profile 142 is greater than the angle of attack 844 of the airfoil-shaped profile 144. By means of the airfoil-shaped profiles 142, 144 and the different angles of attack 842, 844, the sideward thrust 852, 854 may efficiently be generated in operation of the propeller 130 and, more particularly, in the forward flight condition of the compound helicopter 100 of FIG. 1 to FIG. 4, at least partly by deviating the airstream 810.

It should be noted that the sideward thrust 852, 854 which is illustratively generated in FIG. 8 points from the side 340 to the side 330, i. e. in counterclockwise direction. Generating sideward thrust in this direction is required if the main rotor 120 of the compound helicopter 100 of FIG. 1 to FIG. 4 rotates in the counterclockwise direction such that main rotor torque in the clockwise direction must be counteracted.

FIG. 9 shows the propeller 130 and the shrouded duct 140 of FIG. 1 to FIG. 4, seen along a cutting line IX-IX of FIG. 2. Accordingly, the diametrically opposed sides 203, 204 of the shrouded duct 140, which correspond to the upper deck side (105) and the bottom line side (210) of the shrouded duct 140 in FIG. 2, are further illustrated.

Similar to FIG. 8, the shrouded duct 140 accommodates the propeller 130 which comprises a predetermined number of propeller blades. By way of example, two propeller blades 136, 138 are shown with associated blade tips 936, 938. The propeller blades 936, 938 may be provided in addition to the propeller blades 132, 134 of FIG. 8 and likewise rotate in operation around the rotation axis 805 of FIG. 8 in order to generate the airstream 810.

According to one aspect, the shrouded duct 140 is formed to generate downward thrust 956, 958 for provision of an increased pitch stability of the compound helicopter 100 of FIG. 1 to FIG. 4. The generation of the downward thrust 956, 958 is at least partly achieved by deviating the airstream 810. Preferably, the downward thrust 956, 958 is generated in addition to the sideward thrust 852, 854 of FIG. 8.

Illustratively, the shrouded duct 140 comprises at least first and second airfoil-shaped profiles. By way of example, the shrouded duct 140 comprises a first airfoil-shaped profile 146 and a second airfoil-shaped profile 148. By way of example, the airfoil-shaped profiles 146, 148 are arranged on the diametrically opposed sides 203, 204 of the shrouded duct 140 and comprise varying thicknesses over their respective lengths. Preferably, the airfoil-shaped profiles 146, 148 are provided in addition to the airfoil-shaped profiles 142, 144 of FIG. 8, as illustrated by way of example in FIG. 11 to FIG. 13.

As illustrated, the airfoil-shaped profiles 146, 148 may be formed with different angles of attack 946, 948 relative to the rotation axis 805 of the propeller 130. By way of example, the angle of attack 946 of the airfoil-shaped profile 146 is greater than the angle of attack 948 of the airfoil-shaped profile 148. By means of the airfoil-shaped profiles 146, 148 and the different angles of attack 946, 948, the downward thrust 956, 958 may efficiently be generated in operation of the propeller 130 and, more particularly, in the forward flight condition of the compound helicopter 100 of FIG. 1 to FIG. 4, at least partly by deviating the airstream 810.

Figure 10:
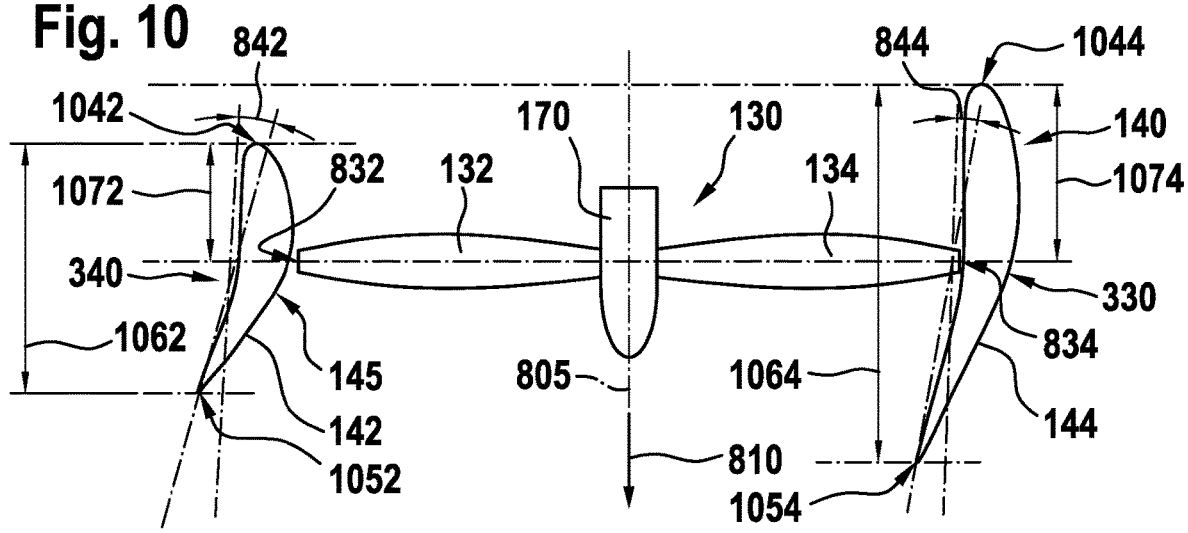
FIG. 10 shows a variant of the propeller and the shrouded duct of FIG. 8.

FIG. 10 shows the propeller 130 with the rotation axis 805 and the shrouded duct 140 with the airfoil-shaped profiles 142, 144 of FIG. 8. However, in contrast to FIG. 8 the airfoil-shaped profiles 142, 144 now illustratively comprise associated leading edges 1042, 1044 that are spaced apart with different distances 1072, 1074 from a propeller plane, i. e. a circular propeller disc (135 in FIG. 11) of the propeller 130 in a direction parallel to the rotation axis 805 of the propeller 130. By way of example, the different distances 1072, 1072 vary along a circumference (1410 in FIG. 14) of the shrouded duct 140.

Furthermore, the airfoil-shaped profiles 142, 144 may also be formed with different lengths 1062, 1064 in the direction parallel to the rotation axis 805 of the propeller 130. By way of example, the length 1062 between the leading edge 1042 and a respective trailing edge 1052 of the airfoil-shaped profile 142 is smaller than the length 1064 between the leading edge 1044 and a respective trailing edge 1054 of the airfoil-shaped profile 144.

It should be noted that the variations described above with respect to the airfoil-shaped profiles 142, 144 may likewise be applied to the airfoil-shaped profiles 146, 148 of FIG. 9. In other words, the airfoil-shaped profiles 146, 148 of FIG. 9 may also be formed with different lengths and differently spaced apart leading edges.

Figure 11:
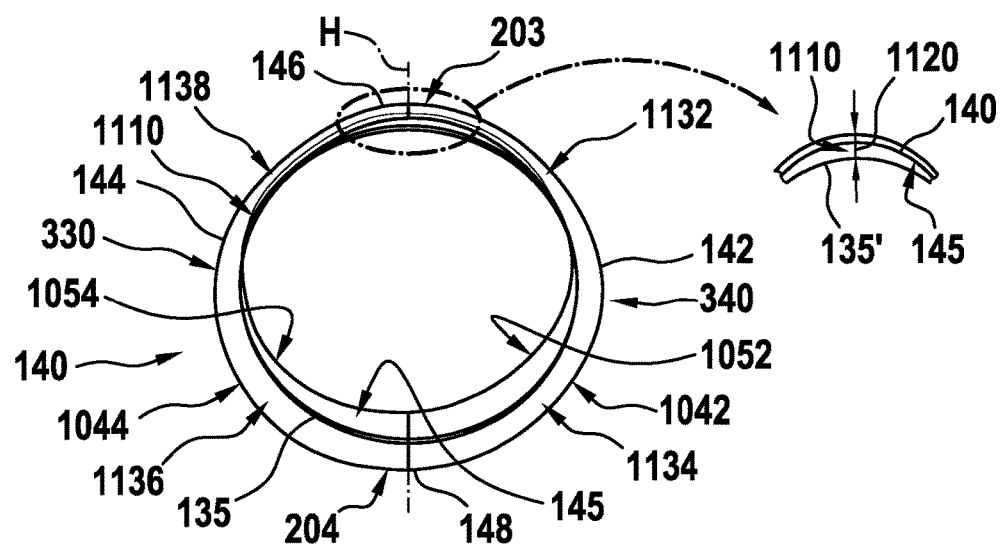
FIG. 11 shows a front view of the shrouded duct of FIG. 8 to FIG. 10.

FIG. 11 shows the shrouded duct 140 of FIG. 1 to FIG. 4 in conjunction with FIG. 8 to FIG. 10, seen in a viewing direction 350 of FIG. 3 and oriented in direction of a height axis H of the shrouded duct 140. Accordingly, the shrouded duct 140 illustratively comprises the airfoil-shaped profiles 142, 144, 146, 148 with the airfoil-shaped profile 146 on the top in direction of the height axis H. The airfoil-shaped profile 142 is preferably connected via smooth transitions 1132, 1134 to the airfoil-shaped profiles 146, 148, and the airfoil-shaped profile 144 is preferably connected via smooth transitions 1136, 1136 to the airfoil-shaped profiles 146, 148.

By way of example, the shrouded duct 140 with the inner air duct 145 is shown together with a circular propeller disc 135, represented by a ring, which is formed by the blade tips 832, 834 of FIG. 8, and/or 936, 938 of FIG. 9, in rotation of the propeller 130 around the rotation axis 805 of FIG. 8 to FIG. 10. Preferably, the circular propeller disc 135 is at least essentially arranged inside of the inner air duct 145.

The inner air duct 145 may be formed with a circular shape in the region of the circular propeller disc 135 and with a non-circular shape otherwise. The circular shape in the region of the circular propeller disc 135 is preferably formed such that a respective distance between the inner air duct 145 and the circular propeller disc 135, i. e. between the inner air duct 145 and blade tips 832, 834 of FIG. 8 and/or 936, 938 of FIG. 9 in rotation of the propeller 130 around the rotation axis 805 of FIG. 8 to FIG. 10, is minimized in order to enable generation of maximized thrust. The non-circular shape, in turn, is illustrated by way of example with a magnified cutout that shows a section of the shrouded duct 140 with the inner air duct 145, as well as a section of a virtual cylindrical extension 135' of the circular propeller disc 135. As can be seen, a varying gap 1110 may be formed between the virtual cylindrical extension 135' and the inner air duct 145, i. e. a gap with a height 1120 that varies in circumferential direction of the shrouded duct 140.

Figure 12:
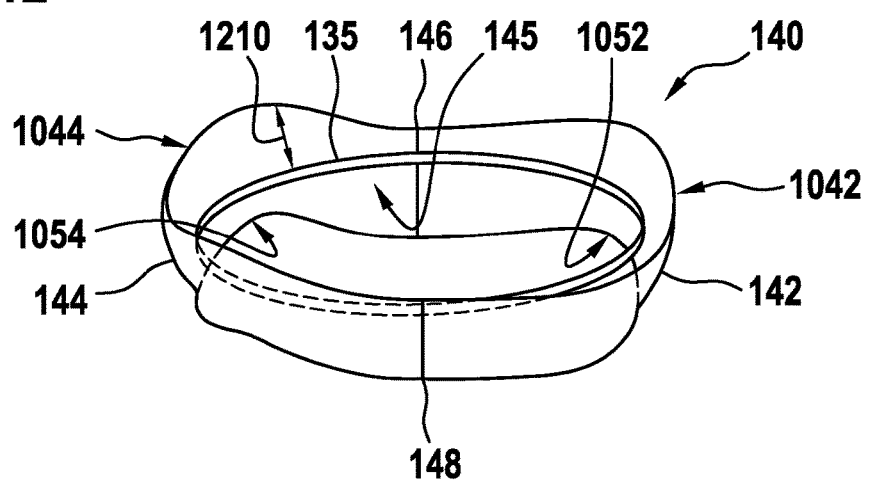
FIG. 12 shows a perspective view of the shrouded duct of FIG. 8 to FIG. 11.

FIG. 12 shows the shrouded duct 140 of FIG. 1 to FIG. 4 in conjunction with FIG. 8 to FIG. 11, together with the circular propeller disc 135 of FIG. 11. The shrouded duct 140 illustratively comprises the airfoil-shaped profiles 142, 144, 146, 148 and the inner air duct 145.

More specifically, a varying distance 1210 in circumferential direction of the shrouded duct 140 between a leading edge and/or trailing edge of the shrouded duct 140 and the circular propeller disc 135 is illustrated. By way of example, the varying distance 1210 is represented between the leading edge 1044 of the airfoil-shaped profile 144 and the circular propeller disc 135.

Figure 13:
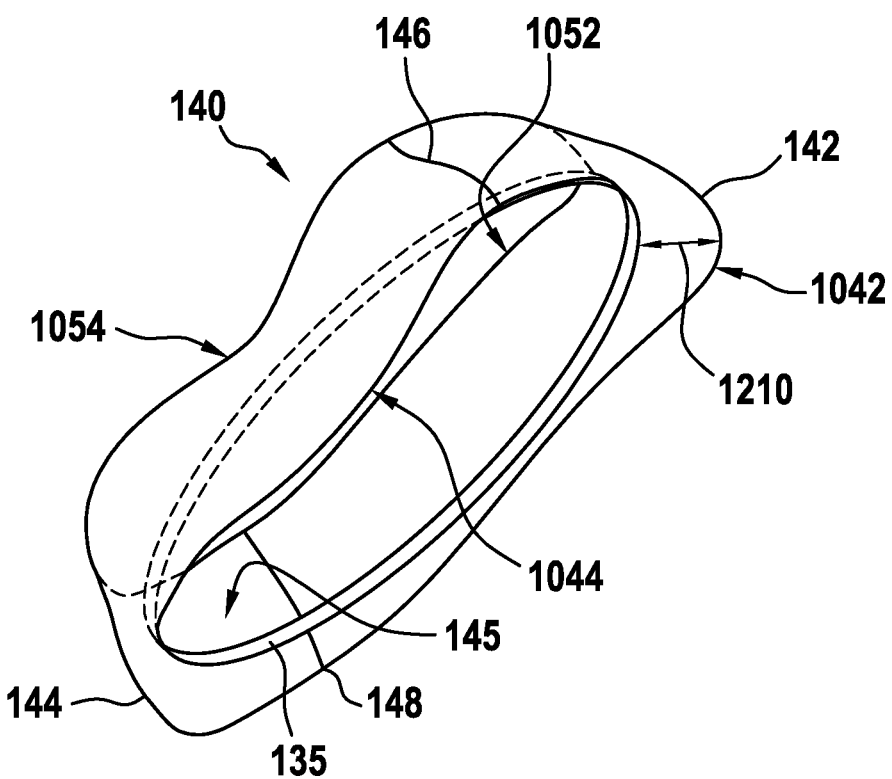
FIG. 13 shows another perspective view of the shrouded duct of FIG. 8 to FIG. 12.

FIG. 13 shows the shrouded duct 140 of FIG. 1 to FIG. 4 in conjunction with FIG. 8 to FIG. 12, together with the circular propeller disc 135 of FIG. 11 and FIG. 12. The shrouded duct 140 illustratively comprises the airfoil-shaped profiles 142, 144, 146, 148 and the inner air duct 145. By way of example, the varying distance 1210 of FIG. 12 is now represented between the leading edge 1042 of the airfoil-shaped profile 142 and the circular propeller disc 135.

Figure 14:
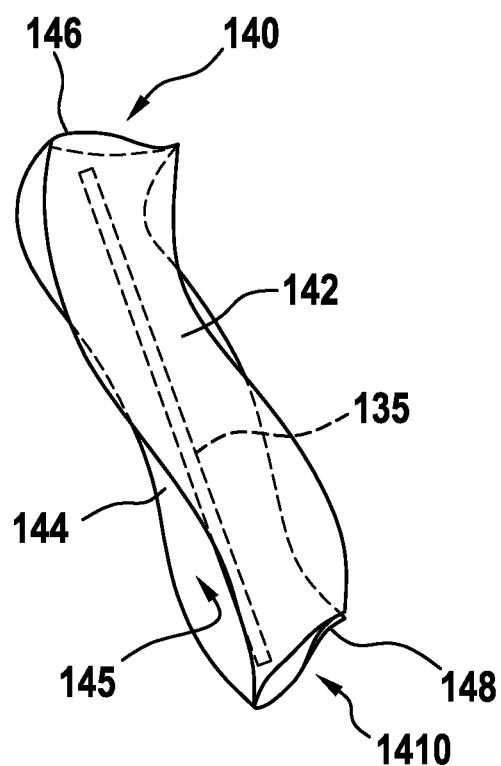
FIG. 14 shows a side view of the shrouded duct of FIG. 8 to FIG. 13.

FIG. 14 shows the shrouded duct 140 of FIG. 1 to FIG. 4 in conjunction with FIG. 8 to FIG. 13, together with the circular propeller disc 135 of FIG. 11 to FIG. 13. The shrouded duct 140 illustratively comprises the airfoil-shaped profiles 142, 144, 146, 148 and the inner air duct 145.

By way of example, the shrouded duct 140 is formed as an undulated ring. In other words, the shrouded duct 140 preferably comprises a wave-shaped circumference 1410 that undulates in circumferential direction of the shrouded duct 140 around, or with respect to, the circular propeller disc 135.

At this point, it should be noted that the shrouded duct 140 is described above with respect to a preferred form and shaping. In other words, the shrouded duct 140 is described by means of characteristics such as different cross-sectional airfoil-shaped profiles, profile lengths, angles of attack, varying distances of leading/trailing edges of the profiles to the circular propeller disc, etc. However, particular dimensions of these characteristics are not cited in detail as they need to be determined respectively in an application-specific manner dependent on an underlying configuration of the compound helicopter 100 of FIG. 1 to FIG. 4. Determination of suitable dimensions, however, is considered to fall into the common knowledge of the person skilled in the art.

Furthermore, it should be noted that modifications to the above-described realizations are also within the common knowledge of the person skilled in the art and, thus, also considered as being part of the present disclosure. For instance, the airfoil-shaped aerodynamic device 150 described above may be realized with one, two or more separate airfoil-shaped aerodynamic devices. Similarly, instead of being provided with the single wing-type aerodynamic device 160, two or more wing-type aerodynamic devices may be provided.

Moreover, the shrouded duct described above may at least partly be reduced in its length, i. e. have a reduced or recessed area such as a cut-out which may e. g. be arranged in a bottom part of the shrouded duct between the airfoil-shaped aerodynamic device and the wing-type aerodynamic device. In addition, or alternatively, respective leading and trailing edges of the shrouded duct described above may be moveable forward and aft in direction of the roll axis.

REFERENCE LIST

100 rotary wing aircraft
101 aircraft nose region
102 aircraft aft region
103 port side wall 104 starboard side wall
105 aircraft upper deck
106 fuselage lower side
110 fuselage
111 cabin
112 fuselage front section
114 fuselage rear section
115 recess area
116 fuselage upper limit
118 upper deck cowling
120 main rotor
122 rotor plane
123 rotor head
124 rotor mast
125, 126, 127, 128, 129 rotor blades
130 tail propeller
132, 134, 136, 138 propeller blades
135 tail propeller disc
135' virtual cylindrical extension of tail propeller disc
140 shrouded duct
142, 144, 146, 148 shrouded duct airfoil-shaped profiles
145 air duct
150 airfoil-shaped aerodynamic device
160 wing-type aerodynamic device
170 uncovered propeller drive shaft
190 asymmetrical cross-sectional profile of rear section
191, 193, 195, 197 asymmetrical cross-sectional profiles
203, 204 opposite shrouded duct sides
210 bottom line
220 bottom line inclination angle
230 horizontal reference plane
240 aircraft rear door
250 swept back structure
310 width of wing-type aerodynamic device
315 75% length limit
320 smooth transition
330, 340 opposite shrouded duct sides
350 viewing direction
410 source of asymmetry
420 plate-shaped protrusion
510 big diameter cylinder shaft
520, 530 shaft bearings
610 big diameter conical shaft
620, 630 shaft bearings
720 propeller drive shaft rotation direction
730 main rotor downwash
740 sideward force
805 rotation axis of propeller
810 airstream
832, 834 tail propeller blade tips
842, 844 angles of attack
852, 854 generated sideward thrust
936, 938 tail propeller blade tips
946, 948 angles of attack
956, 958 generated downward thrust
1042, 1044 leading edges
1052, 1054 trailing edges
1062, 1064 profile length
1072, 1074 leading edge to tail propeller disc distance
1110 varying gap
1120 gap height
1132, 1134, 1136, 1138 smooth transitions
1210 varying distance
1410 wave-shaped circumference
H height axis
P aircraft pitch axis
R aircraft roll axis
Y aircraft yaw axis

What is claimed is:

1. A rotary wing aircraft that extends along an associated roll axis between a nose region and an aft region and that comprises a fuselage with a front section and a rear section, the rotary wing aircraft comprising:
a main rotor that is at least configured to provide lift in hover condition of the rotary wing aircraft,
a stationary shrouded duct that is rigidly arranged in the aft region and that forms a stationary inner air duct which extends along the associated roll axis, wherein the shrouded duct generates sideward thrust for main rotor anti-torque and downward thrust for pitch stability in forward flight condition of the rotary wing aircraft, and
a propeller that is at least configured to propel the rotary wing aircraft in the forward flight condition;
wherein the propeller comprises a predetermined number of propeller blades with associated blade tips which form a circular propeller disc in rotation of the propeller around an associated rotation axis,
wherein the propeller is rotatably mounted to the shrouded duct such that the circular propeller disc is arranged inside of the inner air duct,
wherein the shrouded duct comprises at least a first airfoil-shaped profile and a second airfoil-shaped profile which are formed with different angles of attack relative to the associated rotation axis of the propeller and arranged on diametrically opposed sides of the shrouded duct, wherein the shrouded duct further comprises at least a third airfoil-shaped profile and a fourth airfoil-shaped profile which are arranged on diametrically opposed sides of the shrouded duct respectively between the first and second airfoil-shaped profiles and connected via edgeless transitions to the first and second airfoil-shaped profiles, and wherein the first and second airfoil-shaped profiles are configured to generate the sideward thrust and the third and fourth airfoil-shaped profiles are configured to generate the downward thrust.

2. The rotary wing aircraft of claim 1,
wherein the angle of attack of the first airfoil-shaped profile is greater than the angle of attack of the second airfoil-shaped profile.

3. The rotary wing aircraft of claim 1,
wherein the first and second airfoil-shaped profiles are formed with different lengths in a direction parallel to the associated rotation axis of the propeller.

4. The rotary wing aircraft of claim 3,
wherein the length of the first airfoil-shaped profile is smaller than the length of the second airfoil-shaped profile.

5. The rotary wing aircraft of claim 1,
wherein the first and second airfoil-shaped profiles comprise associated leading edges that are spaced apart with different distances from the circular propeller disc in a direction parallel to the associated rotation axis of the propeller.

6. The rotary wing aircraft of claim 5,
wherein the different distances vary along a circumference of the shrouded duct.

7. The rotary wing aircraft of claim 1,
wherein the shrouded duct is formed as an undulated ring.

8. The rotary wing aircraft of claim 1,
wherein the inner air duct is formed with a circular shape in the region of the circular propeller disc and with a non-circular shape otherwise.

9. The rotary wing aircraft of claim 1,
wherein the rear section of the fuselage extends between the front section and the shrouded duct and comprises an asymmetrical cross-sectional profile in direction of the associated roll axis that is configured to generate sideward thrust for main rotor anti-torque from main rotor downwash, and/or wherein the rear section comprises at least one airfoil-shaped aerodynamic device that extends from the front section to the aft region, and wherein the at least one airfoil-shaped aerodynamic device is configured to generate sideward thrust for main rotor anti-torque from main rotor downwash.

10. The rotary wing aircraft of claim 1, further comprising at least one source of asymmetry that is connected to the front section of the fuselage such that the front section comprises at least in sections an asymmetrical cross-sectional profile in direction of the associated roll axis, wherein the at least one source of asymmetry is configured to generate sideward thrust for main rotor anti-torque from main rotor downwash.

11. The rotary wing aircraft of claim 1, further comprising an uncovered propeller drive shaft configured to generate sideward thrust for main rotor anti-torque via a Magnus effect upon rotation in main rotor downwash.

12. The rotary wing aircraft of claim 1, which is embodied as a compound helicopter, wherein the front section of the fuselage forms a cabin for passengers and/or cargo, wherein the propeller is a pusher propeller, and wherein the main rotor forms a single rotor plane.

13. The rotary wing aircraft of claim 11,
wherein the uncovered propeller drive shaft is a cylinder shaft or a conical shaft.

14. The rotary wing aircraft of claim 11,
wherein the uncovered propeller drive shaft is a cylinder shaft.

15. The rotary wing aircraft of claim 11,
wherein the uncovered propeller drive shaft is a conical shaft.

* * * * *